Nov. 9, 1937.    J. M. RUSNAK    2,098,838
WORK LOCATING INDICATOR FOR JIG BORING MACHINES
Filed Sept. 17, 1935
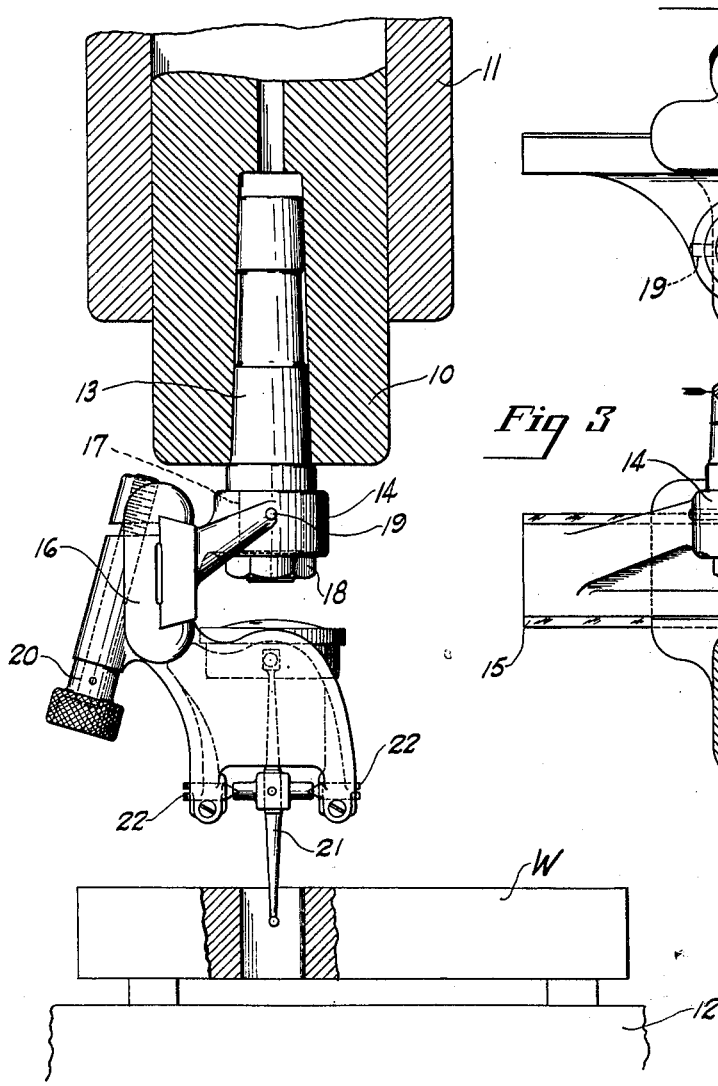
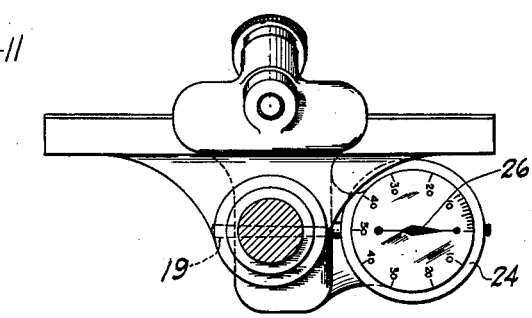
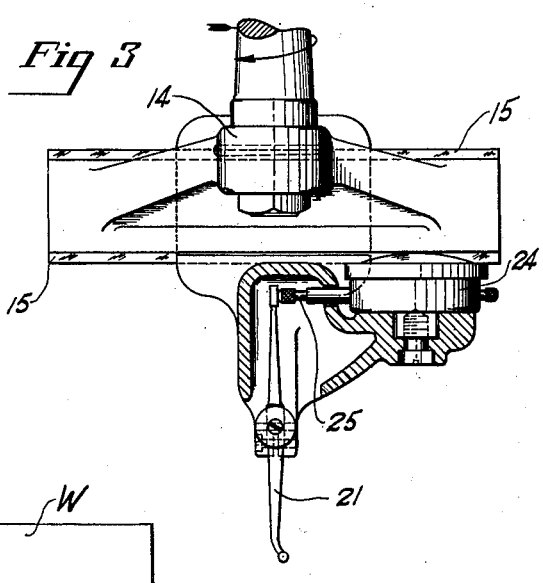
INVENTOR.
J. M. Rusnak
BY Joseph K. Schofield
ATTORNEY Patented Nov. 9, 1937

2,098,838

UNITED STATES PATENT OFFICE 2,098,838

WORK LOCATING INDICATOR FOR JIG BORING MACHINES

John M. Rusnak, West Hartford, Conn., assignor, by mesne assignments, to Niles-Bement-Pond Company, New York, N. Y., a corporation of New Jersey Application September 17, 1935, Serial No. 40,955

2 Claims. (Cl. 33—172)

This invention relates to an improved locating or setting device for work pieces in precision boring and other metal cutting tools.

A primary object of the invention is to provide a universal setting or locating device adapted for temporary attachment to the spindle of a jig borer or other machine tool having a rotating tool or cutter spindle which will enable a work piece to be accurately located with respect to the axis of a tool rotating spindle.

One feature which enables me to accomplish the above named object is that the device is adapted to be secured within the tool receiving portion of a rotating spindle and is provided with a guideway extending transversely relative to the axis of the spindle upon which a sensitive indicator may be mounted at adjustable distances from the axis of rotation of the spindle.

Another feature of importance of the invention is that an oscillating lever having a depending work engaging portion has an extended upper end directly engaging the actuating spindle of a dial indicator, the lever being mounted for oscillation upon a horizontal axis and the body portion of the dial indicator being fixedly secured to a head movable transversely relative to the spindle on which the device is mounted.

With the above and other objects in view my invention includes the features of construction and operation set forth in the following specification and illustrated in the accompanying drawing.

In the accompanying drawing annexed hereto and forming a part of this specification I have shown my invention attached to and being used in a precision boring machine of the vertical type, but it will be understood that the invention can be otherwise embodied and that the drawing is not to be construed as defining or limiting the scope of the invention, the claims appended to this specification being relied upon for that purpose.

In the drawing:

Figure 1 is a side elevation of a complete device shown applied to the spindle of a vertical boring machine and engaging an internal surface of a work piece mounted upon the work supporting table forming part of the boring machine.

Fig. 2 is a plan view of the device removed from the spindle of the boring machine; and Fig. 3 is a side elevation partly in section and showing the parts disposed at right angles from the position shown in Fig. 1.

In the above mentioned drawing I have shown but one embodiment of the invention which is now thought preferable, but it is to be understood that changes and modifications may be made within the scope of the appended claims without departing from the spirit of the invention.

Briefly and in its preferred aspect my invention may include the following principal parts: First, a tapered shank adapted to fit and be frictionally retained within the tool recess of a boring machine spindle; second, a body member fixedly mounted upon a portion of the shank and having guideways extending in a direction transversely of the axis of the spindle in which the shank is mounted; third, a head member movable upon the ways formed on the body member; fourth, clamping means for the head along the guideways of the body member; fifth, a lever mounted for oscillation upon a horizontal axis within said head and adapted at its lower extended portion to contact with a portion of the work piece being located; and sixth, a dial indicator secured in fixed position upon the head and having its actuating spindle engaging against the extended upper end of the pivotally mounted lever.

In the operation of boring holes at extremely precise distances one from another as in jigs and fixtures for metal parts made in large numbers, it is essential that the work be initially positioned accurately with respect to the entire group of holes. One hole or projection previously formed, however, may be employed as a reference from which the remaining holes of the group may be located. The present invention provides a convenient and efficient means for preliminarily locating a work piece relative to the spindle of a boring machine from an initial reference surface to properly locate the work piece for a series of subsequent operations.

Referring more in detail to the figures of the drawing, there is shown at 10 the spindle of a boring or drilling machine rotatable within a sleeve 11. These parts may be similar to corresponding parts employed in the patent to Hanson 1,323,267 granted December 2, 1919. It will be understood also that means to rotate the spindle 10 are provided and to also raise and lower the spindle 10 and sleeve 11 relative to the work support 12. As the headstock and other parts of the boring machine form no part of the present invention they are not shown.

Within the tool receiving socket of the spindle 10 is mounted the shank 13 of the setting device, there being a body member 14 secured rigidly thereto. Any means may be employed to retain the shank 13 within the socket of the spindle 10, usually, however, friction between the surfaces being ample for that purpose.

On the body member 14 of the setting device are laterally extending guideways 15 along which may be adjusted a head 16 carrying indicating means for work pieces being positioned. The guideways 15 extend horizontally and in opposite directions so that the positioning head 16 is adjustable in a direction normal to the axis of and on either side of the spindle 10. Preferably and as shown, the shank 13 and body portion 14 are separate members and are securely fastened permanently together. For that purpose the shank 13 has a cylindrical extension 17 fitting within a central opening in the body member 14. A nut 18 retains the body member 14 in position and in addition a taper pin 19 may be provided to rigidly retain the body member in secured position relative to the shank.

Adjustable along the guideways 15 of the body member 14 is the indicating head 16 adapted to be secured in any adjusted position along the ways 15 as by a clamping screw 20. The head 16 has mounted thereon a lever 21 centrally pivotally supported so that it may swing about a horizontal axis. In order that this lever 21 may swing with minimum possible friction conical bearings are provided on the ends of oppositely extending screws 22, the ends engaging conical recesses in the hub or central portion of the oscillating lever 21.

Also mounted on the head 16 is an indicator 24 preferably of the dial type having an axially movable spindle 25 extending therefrom by means of which the pointer 26 of the indicator may be actuated. The forward end of this spindle 25 engages against a side face at the upper end of the lever 21. Oscillations therefore of the lever 21 will cause the pointer 26 of the indicator 24 to move over the dial.

In the use of the setting device the work support 12 on which the work piece W is mounted is positioned so that the hole or projection to be centered is approximately below the spindle 10. The spindle 10 is then lowered with the setting device thereon and the head 16 adjusted laterally until the lower end of the lever 21 engages a cylindrical surface of the work. The spindle is then rotated slowly preferably by hand and oscillations of the lever are observed by movements of the pointer. Adjustment laterally of the head 16 is made if necessary to assure contact between the lever 21 and surface of the work piece W throughout the rotation of the device about the work piece. Successive adjustments of the work piece W may be made by the adjusting means therefore (not shown) until the work piece is in position with the surface engaged by the lever 21 exactly in alignment with the axis of the spindle 10. This position will be indicated by the indicator pointer 26 remaining in the same position on the dial throughout a complete rotation of the device with the lever 21 in contact with the work piece. With the work positioned as above a reference surface has been established from which other holes may be bored at any predetermined distances therefrom.

What I claim is:

1. A setting device for boring machine work supports comprising in combination, a body member adapted for mounting upon the spindle of said machine, a single piece head on said body member adjustable in a direction normal to the axis of rotation of said spindle, an indicator having its body member detachably fixed to said head, and a centrally pivoted lever mounted for oscillation upon bearings within said head about an axis normal to the axis of said spindle, said lever at its lower end being adapted to engage a surface of the work piece being positioned and at its upper end engaging the actuating member of said indicator.

2. A setting device for boring machine work supports comprising in combination, a body member adapted for mounting upon the spindle of said machine, a single piece head adjustable on said body member in a direction normal to the axis of the spindle, an indicator having a movable pointer and having its body portion detachably secured directly to said head, and a lever pivotally mounted centrally of its length upon bearings within said head for movement about an axis normal to the axis of rotation of said spindle, said lever being adapted to engage a surface of a work piece being positioned at one end and having its opposite end in contact with the actuating member of said indicator, whereby oscillation of said lever will vary the position of the indicator pointer.

JOHN M. RUSNAK.